United States Patent [19]

Nordeen

[11] Patent Number: 4,938,249

[45] Date of Patent: Jul. 3, 1990

[54] CHIP TOLERANT FLAPPER

[75] Inventor: Craig A. Nordeen, Manchester, Conn.

[73] Assignee: United Technologies Corporation, Hartford, Conn.

[21] Appl. No.: 925,051

[22] Filed: Oct. 30, 1986

[51] Int. Cl.[5] .......... G05D 16/00

[52] U.S. Cl. .......... 137/82; 137/625.62; 137/625.64

[58] Field of Search .......... 137/82, 85, 625.62, 137/625.64; 251/80

[56] References Cited

U.S. PATENT DOCUMENTS

| | | | |
|---|---|---|---|
| 2,883,995 | 9/1954 | Bialous et al. | 137/85 |
| 3,134,425 | 2/1961 | Oppenheimer et al. | 158/99 |
| 3,297,044 | 1/1967 | Thorburn | 137/82 |
| 3,446,229 | 5/1966 | Howland | 137/85 |
| 3,771,543 | 11/1973 | Wiggins | 137/100 |
| 3,874,405 | 4/1975 | Thayer | 137/625.62 |
| 3,894,552 | 7/1975 | Bowditch | 137/82 |
| 4,131,130 | 12/1978 | Ruby | 137/596.17 |

FOREIGN PATENT DOCUMENTS

| | | |
|---|---|---|
| 0127969 | 12/1984 | European Pat. Off. . |
| 579615 | 8/1946 | United Kingdom . |
| 1041598 | 12/1966 | United Kingdom . |

OTHER PUBLICATIONS

"Applications Case History", Gas Turbine Fuel Controls, Hydraulic Servocontrols Corporation, (undated).

*Primary Examiner*—Alan Cohan

*Attorney, Agent, or Firm*—Lloyd D. Doigan

[57] ABSTRACT

A reverse-flow fluid control system utilizes a pair of rivet-shaped flappers mounted on a motor driven lever to apportion fluid between a pair of nozzles. Each flapper is slideably mounted upon the lever to allow the lever to move relative to and independently of the flapper should a chip become lodged between a flapper and a nozzle as the lever moves towards that nozzle.

4 Claims, 1 Drawing Sheet

CHIP TOLERANT FLAPPER

Technical Field

This invention relates to fluid control systems and more particularly to a flapper valve for use in those systems.

Background Art

Hydraulic servomechanisms are used extensively in fluid control systems in conjunction with electrical controls. The electrical controls sense variations in electrical current flow to control relatively large physical movements as effected by the servomechanism. One shortcoming of some fluid control systems is the inability to respond to very small changes in electrical current flow. U.S. Pat. No. 3,446,229 to Howland entitled HYDRAULIC SERVOSYSTEM addresses the problems in the prior art by placing a flapper valve (hereinafter "flapper") between two nozzles to apportion the flow of fluid between the nozzles (known as a "reverse flow" system). Howland utilizes the spring effect of the hydraulic fluid, which is applied in the same direction as the movement of the flapper to enable a smaller, more precise electromagnetic actuator to be employed to position the flapper. Howland, however, is inefficient because if a chip or other impurity wedges itself between a nozzle and the flapper, the flapper loses its ability to monitor flow to either nozzle. The electromagnetic actuator generally does not have the power to crush the chip nor the option to back off and free it.

Other systems employ a pair of flexible flappers to apportion flow between the two nozzles. Each flapper is attached to a lever extending from a motor and is generally in register with a respective nozzle. The motor positions the lever, moving one flapper towards a nozzle and concomitantly moving the other flapper away from the other nozzle thereby apportioning flow between the nozzles. If a chip or other impurity is trapped between a nozzle and a flapper as the flapper moves towards that nozzle, the flexible nature of the flapper allows the flapper to bend thereby allowing the lever to continue to move towards that nozzle while the other flapper continues to move away from the other nozzle. Apportionment of fluid is thereby maintained to a degree. However, a larger motor is required to bend the flapper when a chip is trapped. Moreover, the flexible flappers may bend toward the nozzles due to the relatively low pressures therein and therefore require a larger motor to move them away from the nozzles. Such bending toward the nozzles may be overcome as disclosed in copending application of common assignee herewith, entitled PRESSURE REGULATOR, U.S. Ser. No. 638,338 filed on Aug. 4, 1984 by Charles F. Stearns. Disclosure Of Invention According to the invention, a reverse flow fluid control system has a flapper mounted upon a lever for motion therewith. The lever is moveable relative to and independently of the flapper so that the lever may continue to move toward the nozzle if the flapper encounters an impediment while moving toward said nozzle with said lever.

According to one embodiment of the invention, a pair of flappers are mounted upon the lever to apportion flow to a pair of nozzles, each flapper being in register with a respective nozzle. The lever pivots the flappers toward one nozzle and away from the other thereby apportioning flow to one nozzle or the other.

Each flapper is rivet-shaped having a barrel portion extending slideably through a plate that attaches to the lever. A first end of the barrel apportions flow to a nozzle. A second end of the barrel attaches to a head which tends to maintain an end of the barrel in close proximity to its respective nozzle.

By mounting the flappers for independent motion relative to the lever, a smaller, more efficient motor can be used to position the valve even if an impediment is trapped between a flapper and a nozzle.

Best Mode For Carrying Out The Invention

This invention in its preferred form is described with respect to a hydraulic servomechanism for use within a hydromechanical fuel control for gas turbine engines. Such a servomechanism might control the pressure drop of fuel across a metering valve so that a desired volumetric flow can be established within the fuel control.

Figure 1:
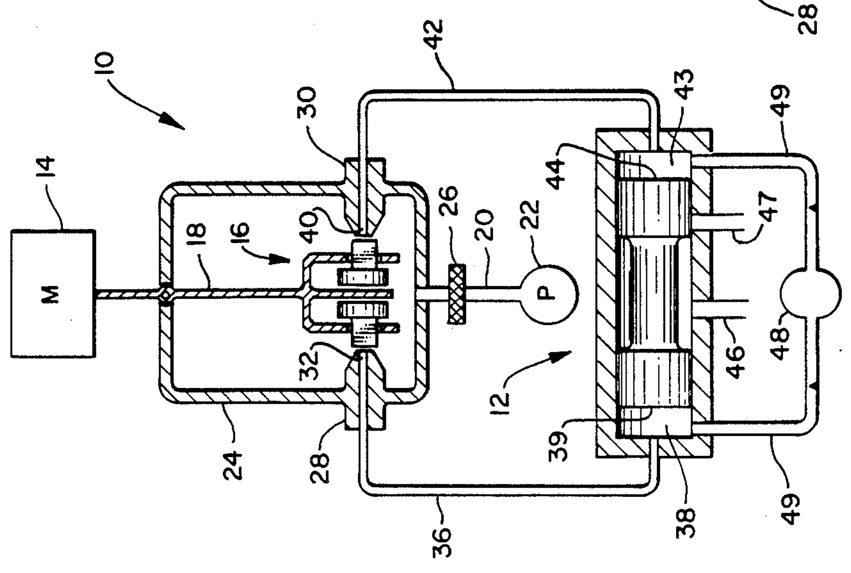
FIG. 1 is a schematic view of a fluid control system.

Referring to FIG. 1, a fluid control system 10 is schematically shown. A hydraulic servomechanism 12 is controlled by a torque motor 14 which drives the flapper arrangement 16 of the invention via a lever 18. Line 20 directs fluid from a pressurized source 22 to a fluid chamber 24 which encloses the flapper arrangement. A filter 26 which removes chips and other particulates is placed within the line 20. A first nozzle 28 and a second nozzle 30 are in fluid communication with the chamber such that fluid may be directed through a first orifice 32 in the first nozzle via line 36 to a chamber 38 at one end 39 of the servomechanism 12 and fluid may be directed through a second orifice 40 in the second nozzle via line 42 to a second chamber 43 at another end 44 of the servomechanism. The flapper arrangement is disposed between the nozzles. The servomechanism controls a larger flow of fluid from line 46 to line 47. Fluid is directed from the chambers 38, 43 to a reservoir 48 by constricted lines 49.

Figure 2:
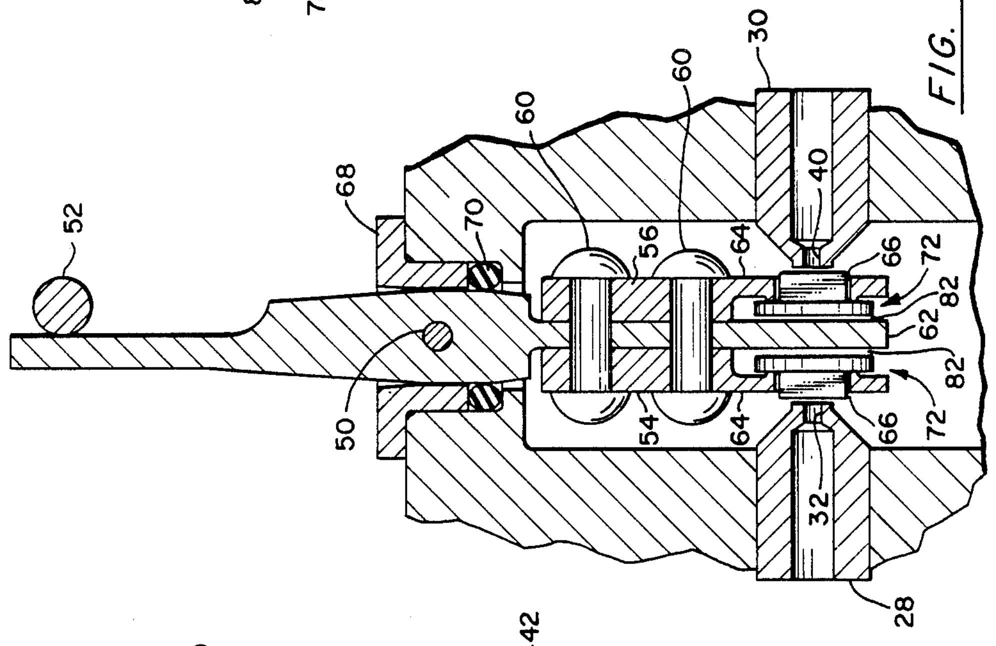
FIG. 2 is a detailed expanded view of a flapper arrangement of FIG. 1.

Referring to FIG. 2, the details of the flappers of FIG. 1 are shown. The lever 18 is adapted to pivot about a point 50 by a connection 52 to the torque motor. A first plate 54 and a second plate 56 are each rigidly attached to a medial portion 58 of the lever below the pivot point. The plates may be attached to the lever by any known means such as the rivets 60 shown. Each plate extends coextensively to an end 62 of the lever and has an area of reduced thickness 64. Each plate has a generally square-shaped hole 66 extending through the area of reduced thickness in register with a respective nozzle. The lever is mounted within the chamber 24 by means of a collar 68. The chamber is sealed from leakage by an o-ring 70 disposed about the lever. The motor 14 is designed to limit the travel of the lever 18 to prevent each flapper 72 from getting too close to the nozzle orifices as will be discussed, infra.

Figure 3:
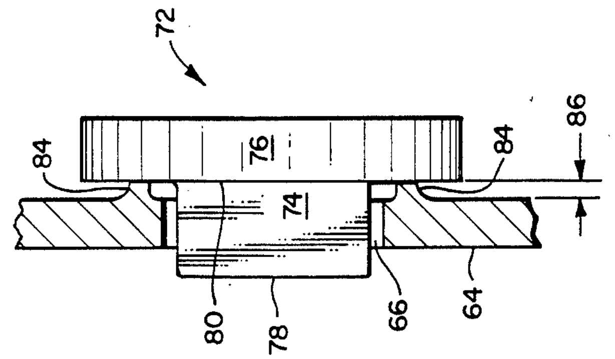
FIG. 3 is a detailed expanded view of a flapper of FIG. 2.

Referring to FIG. 3, the details of a flapper is more clearly shown. Each flapper 72 is generally rivet-shaped having a square barrel portion 74 and a disk-shaped head portion 76. Each barrel has a first end portion 78 for registration with a respective nozzle 28, 30 and a second end portion 80 attaching to the head portion. The barrel conforms generally to the shape of the hole 66 and is adapted to fit therein but has a perimeter of reduced size in comparison to the hole as will be discussed hereinafter. The head of the flapper may be of any shape larger than the hole which prevents the barrel of the flapper from falling through the hole. A gap 82 exists between the head portion 76 and the lever as will be discussed infra (see FIG. 2).

Each plate 64 has a plurality of projections 84 disposed around the hole 66. The projections extend a distance 86 away from the plate, the distance being greater than the largest expected chip to prevent a chip from becoming lodged between the head and the plate.

In operation, the pressure source 22 directs fluid to the pressure chamber 24 where the flappers 72 apportion the flow to the first or second nozzles 28, 30. The lever 18 is designed to move between the nozzles as directed by the torque motor 14. The travel of the flappers is limited by the torque motor so that the flappers do not come into contact with the nozzles. Should a flapper come in contact with the nozzle, the pressure differential within fluid chamber 24, which has a high pressure, and the nozzle orifice 32 or 40, which has an extremely low relative pressure, make it difficult for the motor to move the flapper away from the nozzle. The first end portion 78 of each flapper varies the cross-sectional area of a respective nozzle orifice 32 or 40 as the flapper moves towards and away from the orifice thereby apportioning flow to that orifice.

The spring effect of the hydraulic fluid reacts upon the head portion 76 of each flapper 72 within the gap 82 between each flapper and the lever 58 to seat the head portion of each flapper against its respective plate 64. The gap is large enough so that each flapper is seated against the plate but not so large such that a flapper might fall out of the hole 66. The relatively low pressure in each nozzle orifice also helps seat the head portion of each flapper against its respective plate. By moving the lever back and forth towards one nozzle or the other, fluid can be efficiently apportioned to each nozzle to position the servomechanism 12 as required.

If a chip, which may have a diameter of from a couple of ten thousandths of an inch to a couple of hundredths of an inch depending on the fineness of the filter 26, becomes lodged between a flapper 72 and its respective nozzle as the lever 58 moves towards that nozzle, the flapper backs off the plate 54 towards the lever allowing the lever to continue moving and allowing the other flapper to continue to apportion flow to the other nozzle. Because the flapper impeded by the chip is mounted independently of the plate 54, the plate slides down the barrel of the flapper without requiring additional energy of the motor 14. Each flapper barrel 74 has a perimeter smaller than the perimeter of the hole 66 within each respective plate to prevent chips from wedging between the flapper and the plate. The chips might otherwise prevent each flapper from moving relative to its respective plate.

.Accordingly, what is provided is an improved flapper arrangement that apportions flow to a pair of nozzles, simply, efficiently, and without jamming.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention. One of ordinary skill in the art will note that the projections 84 may be placed upon the head of the flapper as opposed to the plate to prevent chips from being wedged between the head of the flapper and the plate.

What is claimed is:

1. Apparatus disposed between a first nozzle having a first orifice of a given cross-sectional area and a second nozzle having a second orifice of a given cross-sectional area to apportion a flow of pressurized fluid to each of said first and second orifices, said apparatus characterized by:

motor means for selectively moving toward either of said first or second nozzles;

a first plate mounted upon said motor means for movement therewith and having a first means mounted therein for varying the effective cross-sectional area of said first orifice, said first plate being moveable relative to and independently of said first means for allowing said first plate to continue to move toward said first orifice in an unimpeded manner if said first means engages an impediment while moving toward said first orifice; and a second plate mounted upon said motor means for movement therewith and having a second means mounted therein for varying the effective cross-sectional area of said second orifice, said second plate being moveable relative to and independently of said second means for allowing said second plate to continue to move toward said second orifice in a unimpeded manner if said second means engages an impediment while moving toward said second orifice.

2. The apparatus of claim 1, wherein each plate has a hole of a given shape passing therethrough and each of said first and second means has a barrel portion having a cross-sectional shape conforming generally to said given shape, said barrel portion mounted in said hole for longitudinal movement therein.

3. The apparatus of claim 2 wherein each of said first and second means further comprises said barrel having a first end portion for varying the effective cross-sectional area of a respective one of said first or second orifices and a second end portion extending through said hole, and a head means attaching to said second end portion for maintaining said first end portion in close proximity to a respective one of said first or second orifices.

4. The apparatus of claim 3, wherein said given shape is a square and said head means has a perimeter that is greater than a perimeter of said shape.

* * * * *